United States Patent
Johansen

(10) Patent No.: US 9,346,018 B2
(45) Date of Patent: *May 24, 2016

(54) METHOD FOR THE PREPARATION OF A CATALYSED PARTICULATE FILTER AND CATALYSED PARTICULATE FILTER

(75) Inventor: Keld Johansen, Frederikssund (DK)

(73) Assignee: Haldor Topsoe A/S, Lyngby (DK)

( * ) Notice: Subject to any disclaimer, the term of this patent is extended or adjusted under 35 U.S.C. 154(b) by 527 days.

This patent is subject to a terminal disclaimer.

(21) Appl. No.: 13/880,362

(22) PCT Filed: Jul. 1, 2011

(86) PCT No.: PCT/EP2011/003257
§ 371 (c)(1),
(2), (4) Date: Apr. 18, 2013

(87) PCT Pub. No.: WO2012/059144
PCT Pub. Date: May 10, 2012

(65) Prior Publication Data
US 2013/0216441 A1 Aug. 22, 2013

(30) Foreign Application Priority Data
Nov. 2, 2010 (DK) ................................ 2010 00991
Dec. 9, 2010 (DK) ................................ 2010 01110

(51) Int. Cl.
| | |
|---|---|
| B01J 29/04 | (2006.01) |
| B01J 29/87 | (2006.01) |
| B01J 23/00 | (2006.01) |
| B01J 25/00 | (2006.01) |
| B01J 27/00 | (2006.01) |
| B01J 29/00 | (2006.01) |
| B01D 53/94 | (2006.01) |
| B01J 23/44 | (2006.01) |
| B01J 29/76 | (2006.01) |
| B01J 29/85 | (2006.01) |
| B01J 35/00 | (2006.01) |
| B01J 35/02 | (2006.01) |
| B01J 37/00 | (2006.01) |
| B01J 37/02 | (2006.01) |

(52) U.S. Cl.
CPC ............ *B01D 53/9418* (2013.01); *B01J 23/44* (2013.01); *B01J 29/7615* (2013.01); *B01J 29/85* (2013.01); *B01J 35/0006* (2013.01); *B01J 35/023* (2013.01); *B01J 37/0036* (2013.01); *B01J 37/0244* (2013.01); *B01J 37/0246* (2013.01); *B01D 53/944* (2013.01); *B01D 53/9436* (2013.01); *B01D 2255/1021* (2013.01); *B01D 2255/1023* (2013.01); *B01D 2255/2065* (2013.01); *B01D 2255/2092* (2013.01); *B01D 2255/20707* (2013.01); *B01D 2255/20715* (2013.01); *B01D 2255/20761* (2013.01); *B01D 2255/20776* (2013.01); *B01D 2255/30* (2013.01); *B01D 2255/502* (2013.01); *B01D 2255/9022* (2013.01); *B01D 2258/012* (2013.01)

(58) Field of Classification Search
USPC ..................................... 502/100, 60, 208, 300
See application file for complete search history.

(56) References Cited

U.S. PATENT DOCUMENTS

| | | | |
|---|---|---|---|
| 7,947,102 B2 | 5/2011 | Ziebarth | |
| 9,073,047 B2* | 7/2015 | Johansen | ........... B01D 53/9418 |
| 2009/0196812 A1 | 8/2009 | Bull et al. | |
| 2010/0175372 A1 | 7/2010 | Lambert et al. | |
| 2011/0229391 A1 | 9/2011 | Paulus et al. | |
| 2011/0252773 A1* | 10/2011 | Arnold | ............... B01D 46/2429 60/297 |

FOREIGN PATENT DOCUMENTS

| | | |
|---|---|---|
| CN | 101563143 A | 10/2009 |
| CN | 101711185 A | 5/2010 |
| JP | 2007-21422 A | 2/2007 |
| JP | 2010-519039 A | 6/2010 |
| JP | 2011-510899 A | 4/2011 |
| WO | WO 2008/106523 A2 | 9/2008 |
| WO | WO 2009/099937 A1 | 8/2009 |
| WO | WO 2010/051983 A1 | 5/2010 |

\* cited by examiner

*Primary Examiner* — James McDonough
(74) *Attorney, Agent, or Firm* — Blank Rome LLP

(57) ABSTRACT

The invention pertains to a catalyzed particulate filter provided in its entire dispersion side and within its partition walls with a first catalyst being active in selective catalytic reduction of nitrogen oxides, and in its entire permeate side with a second catalyst combination with a catalyst being active in oxidation of ammonia mixed with a catalyst being active in oxidation of carbon monoxide and hydrocarbons and a method for its preparation. The mean particle size of the first catalyst is smaller than the mean pore diameter of the longitudinal porous walls, and the mean particle size of the second catalyst combination is larger than the mean pore diameter of the longitudinal walls. In the example, the first catalyst is a silica aluminum phosphate SAPO-34 promoted with 2% copper and the second catalyst is a mixture of platinum and palladium (molar ratio 3:1) supported on alumina particles and beta zeolite powder with 1.0% copper.

9 Claims, No Drawings

METHOD FOR THE PREPARATION OF A CATALYSED PARTICULATE FILTER AND CATALYSED PARTICULATE FILTER

The present invention relates to multifunctional catalysed diesel particulate filters. In particular, the invention relates to a method for the preparation of catalysed diesel particulate filters having both an activity in the removal of nitrogen oxides by the known selective catalytic reduction (SCR) process, and oxidation activity for the oxidative conversion of hydrocarbons and carbon monoxide contained in the exhaust gas into water and carbon dioxide and the conversion of excess ammonia used as reductant in the SCR into nitrogen.

The invention provides, furthermore, a catalysed particle filter catalysed with an SCR catalyst in its inlet/dispersion channels, filter walls, and with an ammonia slip catalyst together with an oxidation catalyst in the outlet/permeation channels.

In addition to unburnt hydrocarbons, diesel exhaust contains nitrogen oxides (NOx) and particulate matter. NOx, hydrocarbons and particulate matter are materials and chemical compounds representing a health and environmental risk and must be reduced or removed from the engine exhaust gas by passing the exhaust through a particle filter and several catalyst units.

Typically, these filters are honeycomb wall flow filters, wherein the particulate matter is captured on or in partition walls of the honeycomb filter.

In addition to a particulate filter, a number of diesel exhaust gas cleaning systems disclosed in the art comprise a catalyst unit being active in the selective reduction of NOx by reaction with ammonia to nitrogen and a diesel oxidation catalyst.

In order to remove the excess ammonia injected into the exhaust gas for use in the SCR, a number of the exhaust gas cleaning systems comprise additionally a downstream catalyst unit catalysing the conversion of ammonia into nitrogen, the so-called ammonia slip catalyst.

Multifunctional diesel particulate filters coated with catalysts catalysing the above mentioned reactions are also known in the art.

In the known multifunctional filters, the different catalysts are segmentarily or zone coated in different zones of the filter.

Segmentary or zone coating of different catalysts on the filter is an expensive and difficult preparation process.

US 2010/0175372 discloses in one embodiment a diesel exhaust gas treatment system with a filter catalysed with an SCR catalyst on the dispersion side of the filter, and with an ammonia oxidation catalyst and diesel oxidation catalyst on the permeation side. The SCR catalyst is washcoated on the entire filter substrate followed by application of the ammonia oxidation catalyst at the outlet filter channels. The diesel oxidation catalyst is applied as an overlayer on the ammonia oxidation catalyst at the outlet channels.

Compared to the known preparation methods, the present invention suggests an easier method for the preparation of particulate filers catalysed with different catalysts for the selective reduction of nitrogen oxides with ammonia and removal of hydrocarbons, carbon monoxide and excess ammonia.

Accordingly, the invention provides a method for the preparation of a catalysed particulate filter comprising the steps of a) providing a particulate filter body with longitudinal flow passages being confined by longitudinal porous walls, defining a dispersion side and a permeation side;

b) providing a first catalyst washcoat containing a first catalyst composition being active in selective catalytic reduction of nitrogen oxides, c) providing a second catalyst washcoat containing a second combined catalyst composition in form of a mixture of a catalyst being active in selective oxidation of ammonia to nitrogen, and a catalyst being active in oxidation of carbon monoxide and hydrocarbons;

d) coating the particulate filter body with the first catalyst washcoat on the entire dispersion side and within partition walls of the filter body, and coating the particulate filter with the second catalyst washcoat on the entire permeate side of the filter body; and e) drying and heat treating the coated filter to obtain the catalysed particulate filter.

The terms "dispersion side" and "permeate side" as used herein refer to flow passages of the filter facing the unfiltered exhaust gas and to flow passages facing the filtered exhaust gas, respectively.

The main advantage of the method according to the invention is that the filter can be coated with two washcoats to obtain a four-way catalysed particulate filter, where one washcoat contains the oxidation catalyst in combination with the ammonia slip catalyst. Thereby, the preparation of a multifunctional catalysed filter is much improved in terms of an easier and cheaper production setup.

A further advantage of coating a filter with a mixture of catalyst particles catalysing different reactions is found in an improved heat transfer and warm up during cold start. As a result, it is possible to start injection of a reductant and the SCR reaction shortly after the engine has been started.

According to a preferred embodiment of the invention, the first catalyst composition in the first washcoat active in the selective catalytic reduction of NOx comprises at least one of a zeolite, a silica aluminum phosphate, an ion exchanged zeolite, silica aluminum phosphate promoted with iron and/or copper, one or more base metal oxides and a catalyst support of at least one of cerium tungsten oxide on a titania support, an alumina support, a zirconia support, a silica support or mixtures thereof.

Preferably, the zeolite catalyst is selected from beta zeolite or a chabazite zeolite.

A further preferred SCR catalyst for use in the invention is a silica aluminium phosphate with chabazite structure, such as SAPO 34, promoted with copper and/or iron.

The second catalyst composition being active in the oxidation of hydrocarbons, carbon monoxide and ammonia comprises in accordance with a preferred embodiment of the invention, catalyst particles of platinum and palladium supported on at least one of alumina, titania, ceria and zirconia mixed with catalyst particles of copper and/or iron promoted zeolite, preferably beta zeolite or chabazite zeolite, such as SAPO 34 with chabazite structure.

When preparing the washcoats for use in the invention, the catalysts usually in particle form, are milled or agglomerated to the required particle size and suspended in water or organic solvents, optionally with addition of binders, viscosity improvers, foaming agents or other processing aids.

In order to allow the SCR catalyst particles to diffuse effectively into the partition walls during washcoating of the filter and to prevent the oxidation catalyst particles from diffusing from the permeation side to the dispersion side, it is preferred that the SCR catalyst, i.e. the first catalyst has a particle size smaller than the mean pore diameter of the longitudinal porous walls of the filter, and that the mixed oxidation catalyst particles, i.e. the second combined catalyst composition, are larger than the mean pore diameter.

The filter is then washcoated according to common practice, including applying vacuum in the filter, pressurizing the washcoat or by dip coating. The washcoat is introduced into the filter from the inlet of the dispersion side when coating the filter with the first washcoat containing the SCR catalyst particles and from the outlet of the permeation side when coating with the second washcoat containing the mixed oxidation catalyst particles.

According to a preferred embodiment of the invention, the filter is in form of a wall flow monolith with a plurality of longitudinal passages divided by longitudinal porous walls, dispersion side of the passages having an open inlet end and an outlet end being plugged with plugs, and permeate side of the passages having an inlet end being plugged with plugs and an open outlet end.

The term "inlet end" used hereinbefore and in the following description means the end of the filter and the channels being contacted by unfiltered gas and "outlet end" means the end of the filter and the channels where the filtered gas leaves the filter body.

The invention provides furthermore a catalysed particulate filter provided in its entire dispersion side and within its partition walls with a first catalyst being active in selective catalytic reduction of nitrogen oxides, and in its entire permeate side with a second catalyst combination with a catalyst being active in oxidation of ammonia mixed with a catalyst being active in oxidation of carbon monoxide and hydrocarbons.

A preferred filter for use in the invention is a wall flow monolith with a plurality of longitudinal passages divided by longitudinal porous walls, where dispersion side of the passages has an open inlet end and an outlet end being plugged with plugs, and where permeate side of the passages has an inlet end being plugged with plugs and an open outlet end.

Examples of suitable filter materials for use in the invention are silicon carbide, aluminium titanate, cordierite, alumina, mullite or combinations thereof.

The amount of the first washcoat coated on the filter is typically 20 to 180 g/l, and the amount of the second washcoat on the filter is typically 10 to 80 g/l. The total catalyst loading on the filter is typically in the range of 40 to 200 g/l.

EXAMPLE

A first washcoat in form of a suspension of a first catalyst active in SCR is prepared by mixing and dispersing 100 g of silica aluminium phosphate SAPO-34 promoted with 2% copper in 200 ml demineralised water per liter filter. A dispersing agent Zephrym PD-7000 and an antifoam agent are added. The suspension is milled in a bead mill. The particle sizes must be smaller than the mean pore diameter of the pores in the wall of the wall flow filter A second washcoat is in a first step prepared from a mixture of platinum and palladium (molar ratio 3:1) supported on alumina particles with a particle size larger than the filter wall mean pore size. A suspension of the thus prepared catalyst mixture is made by mixing 20 g of the mixture in 40 ml demineralised water pr liter filter. In a second step, a further suspension is prepared containing beta zeolite powder with 1.0% copper with a particle size larger than the filter wall mean pore size. The suspension is prepared by mixing and dispersing 20 g of the copper beta zeolite powder in 40 ml demineralised water per liter filter. A dispersing agent Zephrym PD-7000 and an antifoam agent are added. The suspensions prepared in the first and the second step are then mixed and further dispersed to obtain the second washcoat.

The particle size of the final washcoat must be larger than the mean pore diameter of the pores in the wall of the wall flow filter.

A high porosity (approximately 60% and wall mean pore size approx 18 µm) conventionally plugged SiC wall flow filter is used.

The suspension of the first catalyst is washcoated from the filters dispersion side. The thus partial coated filter is then dried and calcined at 750° C.

The second washcoat suspension with the second combined catalyst is washcoated from the filters permeate side. The filter is then dried and calcined at 750° C.

The invention claimed is:

1. Method for the preparation of a catalysed particulate filter comprising the steps of
    a) providing a particulate filter body with longitudinal flow passages being confined by longitudinal porous walls, defining a dispersion side and a permeation side;
    b) providing a first catalyst washcoat containing a first catalyst composition being active in selective catalytic reduction of nitrogen oxides,
    c) providing a second catalyst washcoat containing a second combined catalyst composition in form of a mixture of a catalyst being active in selective oxidation of ammonia to nitrogen, and a catalyst being active in oxidation of carbon monoxide and hydrocarbons;
    d) coating the particulate filter body with the first catalyst washcoat on the entire dispersion side and within partition walls of the filter body, and coating the particulate filter with the second catalyst washcoat on the entire permeate side of the filter body; and
    e) drying and heat treating the coated filter to obtain the catalysed particulate filter.

2. The method of claim 1, wherein the first catalyst comprises at least one of a zeolite, a silica aluminum phosphate, an ion exchanged zeolite, a silica aluminum phosphate promoted with iron and/or copper, one or more base metal oxides and a catalyst support of at least one of cerium tungsten oxide on a titania support, an alumina support, a zirconia support, a silica support or mixtures thereof.

3. The method of claim 2, wherein the zeolite is a beta zeolite, a chabazite zeolite or a silica aluminum phosphate with chabazite structure and mixtures thereof.

4. The method of claim 3, wherein the silica aluminum phosphate with chabazite structure is SAPO 34 promoted with copper and/or iron.

5. The method of claim 1, wherein the second catalyst composition comprises a mixture of platinum and palladium supported on at least one of alumina, titania, ceria, zirconia and silica mixed with copper and/or iron containing zeolite or silica alumina phosphate with chabazite structure.

6. The method of claim 5, wherein the zeolite is beta zeolite or a chabazite zeolite.

7. The method according to claim 1, wherein the filter is in form of a wall flow monolith with a plurality of longitudinal passages divided by longitudinal porous walls, dispersion side of the passages having an open inlet end and an outlet end being plugged with plugs, and permeate side of the passages having an inlet end being plugged with plugs and an open outlet end.

8. The method of claim 7, wherein the wall flow monolith is washcoated with the first catalyst washcoat from the inlet end of the dispersion side and with the second washcoat from the outlet end of the permeate side.

9. The method according to claim 1, wherein mode particle size of the first catalyst in the first washcoat is smaller than the mean pore diameter of the longitudinal walls, and wherein mode particle size of the second washcoat is larger than the mean pore diameter of the longitudinal walls.

* * * * *